US010526011B2

(12) United States Patent
Linde et al.

(10) Patent No.: US 10,526,011 B2
(45) Date of Patent: Jan. 7, 2020

(54) PULSATION-DAMPED BALL-NUT STEERING

(71) Applicant: Robert Bosch Automotive Steering GmbH, Schwäbisch Gmünd (DE)

(72) Inventors: Joachim Linde, Waldstetten (DE); Michael Merinsky, Heubach (DE)

(73) Assignees: Robert Bosch Automotive Steering, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 180 days.

(21) Appl. No.: 15/744,409

(22) PCT Filed: Jun. 13, 2016

(86) PCT No.: PCT/EP2016/063491
§ 371 (c)(1),
(2) Date: Jan. 12, 2018

(87) PCT Pub. No.: WO2017/008973
PCT Pub. Date: Jan. 19, 2017

(65) Prior Publication Data
US 2018/0201308 A1    Jul. 19, 2018

(30) Foreign Application Priority Data
Jul. 14, 2015  (DE) ........................ 10 2015 111 344

(51) Int. Cl.
*B62D 5/12*   (2006.01)
*B62D 5/06*   (2006.01)
*B62D 5/24*   (2006.01)

(52) U.S. Cl.
CPC ............... *B62D 5/12* (2013.01); *B62D 5/062* (2013.01); *B62D 5/24* (2013.01)

(58) Field of Classification Search
CPC ............. B62D 5/12; B62D 5/062; B62D 5/24
See application file for complete search history.

(56) References Cited

U.S. PATENT DOCUMENTS 3,374,858 A    3/1968  Richards
4,249,456 A *  2/1981  Luckel ................ B62D 5/24
                                                74/499

(Continued)

FOREIGN PATENT DOCUMENTS

DE    195 16 358 C1    8/1996
GB    2 027 399 A      2/1980

OTHER PUBLICATIONS

International Search Report corresponding to PCT Application No. PCT/EP2016/063491, dated Sep. 14, 2016 (German and English language document) (7 pages).

*Primary Examiner* — Kevin Hurley
(74) *Attorney, Agent, or Firm* — Maginot, Moore & Beck LLP (57) ABSTRACT

A ball-nut steering system of a conventional vehicle includes a first and a second cylinder chamber for receiving a fluid, a first feed line for conducting fluid from a pump to the first cylinder chamber, and a device for damping and/or easing pulsations of the fluid. The device is arranged inside the first cylinder chamber and/or inside the first feed line. The first cylinder chamber has a smaller volume for receiving the fluid than the second cylinder chamber.

13 Claims, 5 Drawing Sheets (56) References Cited

U.S. PATENT DOCUMENTS

| | | | | |
|---|---|---|---|---|
| 4,430,047 A | * | 2/1984 | Ilg | F04B 1/0538 417/273 |
| 8,376,080 B2 | * | 2/2013 | Nakakuki | B62D 5/064 180/417 |
| 2006/0011406 A1 | | 1/2006 | Ishikawa et al. | |
| 2017/0314555 A1 | * | 11/2017 | Imanaga | F04C 2/344 |

* cited by examiner

PULSATION-DAMPED BALL-NUT STEERING

This application is a 35 U.S.C. § 371 National Stage Application of PCT/EP2016/063491, filed on Jun. 13, 2016, which claims the benefit of priority to Serial No. DE 10 2015 111 344.9, filed on Jul. 14, 2015 in Germany, the disclosures of which are incorporated herein by reference in their entirety.

The present disclosure relates to a ball-nut steering system of a vehicle, wherein the vehicle is a conventional-cab vehicle, and to a steering system for a vehicle.

BACKGROUND

Ball-nut steering systems are known in the prior art. These ball-nut steering systems have two cylinder chambers of different receiving volumes for a fluid. There is typically one cylinder chamber with a small receiving volume and one cylinder chamber with a large receiving volume. The fluid is forced into these cylinder chambers by a pump, e.g. a positive displacement pump.

Ball-nut steering systems can be provided for a cab-over-engine vehicle, a heavy goods vehicle on which the steering is arranged ahead of the steering axle in the direction of the vehicle, and a conventional-cab vehicle, a heavy goods vehicle on which the steering gear is arranged behind the front axle. Cab-over-engine vehicles are typically used in Europe and conventional-cab vehicles are preferred for use in the USA.

SUMMARY

Operation of the pump always results in pulsation of the fluid. Here, a large cylinder chamber exhibits greater damping of the pulsations than a small cylinder chamber. The large mass within the large cylinder chamber results in greater inertia, giving better damping properties. Furthermore, the fluid contains a certain quantity of air, e.g. if it is hydraulic oil. Air is characterized by high elasticity and compressibility and thereby improves the damping properties of the fluid. The large cylinder chamber contains a larger quantity of air than the smaller cylinder chamber. For this reason too, the smaller cylinder chamber exhibits comparatively significant pulsation. Pulsation of the fluid can propagate as oscillation or vibration as far as the steering wheel via the mechanical links, and this is perceived as troublesome by the driver.

One object is therefore to largely damp or suppress pulsation of a fluid in a ball-nut steering system, especially the pulsation of the fluid in the smaller of the two cylinder chambers.

As a first embodiment of the disclosure, a ball-nut steering system of a conventional-cab vehicle is made available, comprising: a first and a second cylinder chamber for receiving a fluid and a first feed line for carrying fluid from a pump to the first cylinder chamber, wherein the ball-nut steering system comprises a device for damping and/or calming pulsations of the fluid, wherein the device is arranged within the first cylinder chamber and/or within the first feed line, wherein the first cylinder chamber has a smaller volume for receiving the fluid than the second cylinder chamber.

A conventional-cab vehicle is a vehicle, in particular a heavy goods vehicle, the steering gear of which is arranged behind the front axle in the direction of travel of the vehicle. As a result, the cylinder chambers of a ball-nut steering system of a conventional-cab vehicle are interchanged in comparison with a ball-nut steering system for a cab-over-engine vehicle. That is to say that the smaller cylinder chamber of the conventional-cab vehicle is in the position of the larger cylinder chamber of the cab-over-engine vehicle. Particularly in the case of small cylinder chambers, there are problems caused by pulsations coming from the positive displacement pump since the small fluid volume achieves only slight damping of the pulsations. There is therefore a need for a damping device to enable vibration to be excluded at the steering wheel of the vehicle concerned. The device according to the disclosure can be arranged in or in the vicinity of the smaller cylinder chamber and ensures a channel of such length for the fluid concerned that sufficient damping of the pulsations is made possible.

As a second embodiment of the disclosure, a steering system for a vehicle is made available, comprising a ball-nut steering system.

Illustrative embodiments are described in the dependent claims.

According to one illustrative embodiment of the disclosure, a ball-nut steering system is made available, wherein the device is designed as a spiral, serpentine or meandering channel for the fluid flow to the first cylinder chamber and/or wherein the device is formed in one plane.

By means of a spiral, serpentine or meandering design of a fluid flow, it is possible to ensure that there is a long path for the corresponding fluid to the cylinder chamber. By forming the device in one plane, a space-saving form of the device can be achieved.

In another embodiment according to the disclosure, a ball-nut steering system is made available, wherein the device is designed as an insert for retrofitting and/or has webs for the formation of an interspace, wherein the interspace is provided to accommodate a seal.

The leaktightness of the oil duct is a prerequisite for operation as a damper. Through design as an insert, retrofitting can be made possible.

According to one illustrative embodiment of the disclosure, a ball-nut steering system is made available, wherein the device is connected integrally to the ball-nut steering system.

Integral connection of the device for damping to the ball-nut steering system allows low-cost production.

According to another embodiment of the present disclosure, a ball-nut steering system is made available, wherein the device has a bypass, wherein the bypass allows a fluid flow out of the ball-nut steering system while bypassing the device.

The spiral, serpentine or meandering course of the fluid flow in the device increases the flow resistance between the steering valve and the cylinder chamber. In the case of small channel cross sections or long channel lengths in the device, there may be a "hard point" when changing direction, especially at low temperatures, in accordance with increasing viscosity. A "hard point" of this kind should be avoided. The provision of a bypass enables the device for damping to be bypassed during a return flow of the fluid from the ball-nut steering system. This shortens the path of the fluid, and the "hard point" is avoided.

According to another illustrative embodiment of the present disclosure, a ball-nut steering system is made available, wherein the bypass is a sealing lip.

A sealing lip can be configured in such a way that the sealing lip closes when there is a fluid flow into the ball-nut steering system, and the sealing lip opens when the fluid flows out of the ball-nut steering system and thus acts as a bypass to the device for damping.

According to one illustrative embodiment of the disclosure, a ball-nut steering system is made available, wherein the device comprises a plate, which is placed against walls of the ball-nut steering system in order to give a channel for the fluid.

If the device comprises a plate which can be placed on corresponding walls, low-cost production of the device is achieved since the walls of the device can be produced simultaneously with the ball-nut steering system by a casting method.

In another embodiment according to the disclosure, a ball-nut steering system is made available, wherein the device is designed as 1, 2, 3, 4, 5, 6, 7 or any number of obstacles, thereby resulting in a spiral, serpentine and/or meandering pattern of the fluid flow.

By means of a channel cross section which extends in an approximately constant manner over a defined travel distance in the device, calming of the fluid flow and thus damping can be made possible.

According to another embodiment of the present disclosure, a ball-nut steering system is made available, wherein the device is shaped to produce a change in the direction of fluid flow, in particular a 180° turn.

According to one illustrative embodiment of the disclosure, a ball-nut steering system is made available, wherein the fluid is an oil.

According to one illustrative embodiment of the disclosure, a ball-nut steering system is made available, wherein the device has a travel distance of 150 mm to 700 mm for the fluid and/or wherein the device has a cross section of 16 mm$^2$ to 38 mm$^2$ for the fluid.

By means of a travel distance of 150 mm to 700 mm and/or a cross section of 16 mm$^2$ to 38 mm$^2$ for the fluid, optimum damping of the fluid can be achieved.

It can be regarded as a concept of the disclosure to make available a device which is suitable, in the case of a ball-nut steering system for a conventional-cab vehicle, to extend the fluid feed, wherein the fluid is, in particular, oil, to the smaller of the two cylinder chambers in such a way that pulsation of the oil due to the positive displacement pump can be damped or prevented. Moreover, the intention is to prevent a "hard point" in the case of rapid changes in steering direction (pressure changeover). For this purpose, the device has a check valve or a bypass, which allows the oil flow to flow out of the ball-nut steering system without traversing the device for damping. When the oil flow flows into the ball-nut steering system, the check valve is closed. The check valve can be designed as a sealing lip, for example.

Of course, it is also possible for the individual features to be combined with one another, thereby also making it possible in some cases to achieve advantageous effects which go beyond the sum of the individual effects.

BRIEF DESCRIPTION OF THE DRAWINGS

Further details and advantages of the disclosure will become clear from the embodiments illustrated in the drawings, in which.

DETAILED DESCRIPTION

Figure 1:
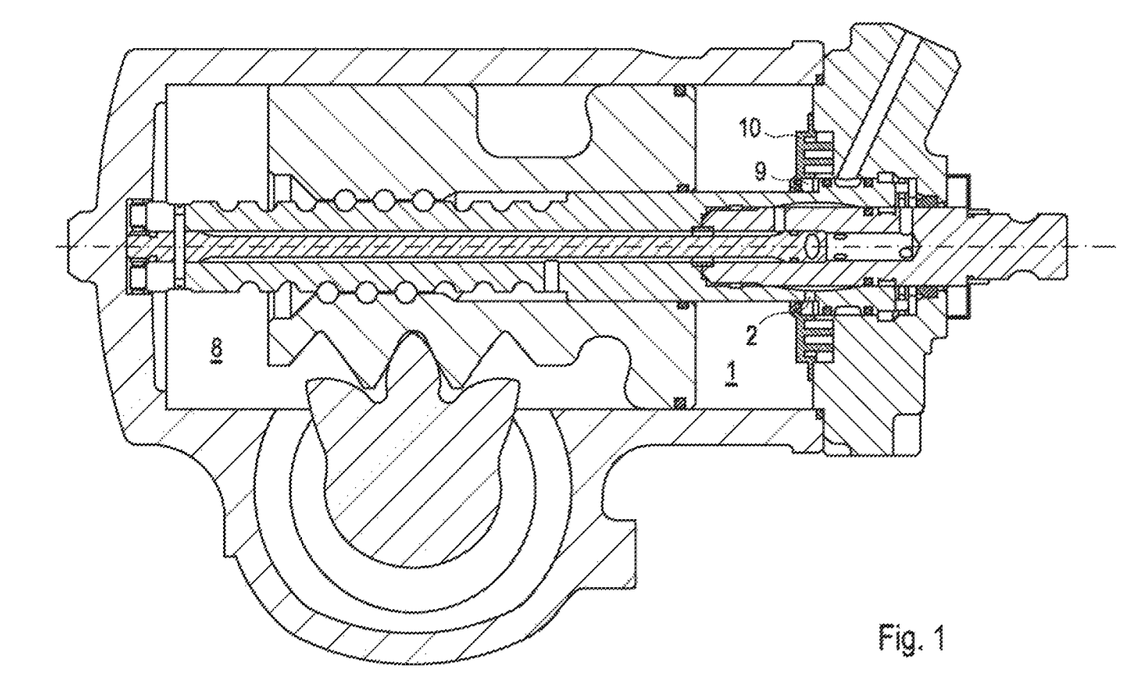
FIG. 1 shows a ball-nut steering system having a small cylinder chamber 1 and a large cylinder chamber 8.

FIG. 1 shows a ball-nut steering system having a small cylinder space/cylinder chamber 1 on the steering-spindle side and a large cylinder space/cylinder chamber 8 remote from the steering-spindle side. Such a construction of a ball-nut steering system is found in conventional-cab vehicles, in which the steering gear is arranged behind the front axle. A fluid is forced into the cylinder chambers 1, 8 by a pump. The pump causes pulsations of the fluid, which can ultimately also lead to vibration/oscillation of the steering wheel. The intention is to reduce or avoid such pulsations. According to the disclosure, it is possible for this purpose to arrange obstacles on the path of the fluid, said obstacles resulting in calming/damping of the fluid. Devices 10 of this kind for calming or damping are preferably arranged in the region of the smaller cylinder chamber 1. It is primarily cylinder chamber 1 which can be regarded as the starting point for pulsations of the fluid that lead to vibration or oscillation of the steering wheel. Owing to the smaller mass of the fluid in cylinder chamber 1 in comparison with cylinder chamber 8, the smaller mass in cylinder chamber 1 tends to produce less damping of the pulsations. The fluid can be composed of air or, for example, can comprise an oil containing a small proportion of air. Air has high compressibility and elasticity and therefore has good damping properties. Because of the smaller quantity of air in cylinder chamber 1 in comparison with cylinder chamber 8, cylinder chamber 1 tends, for this reason too, to be more a source of pulsations that can lead to vibration of the steering wheel.

Figure 2:
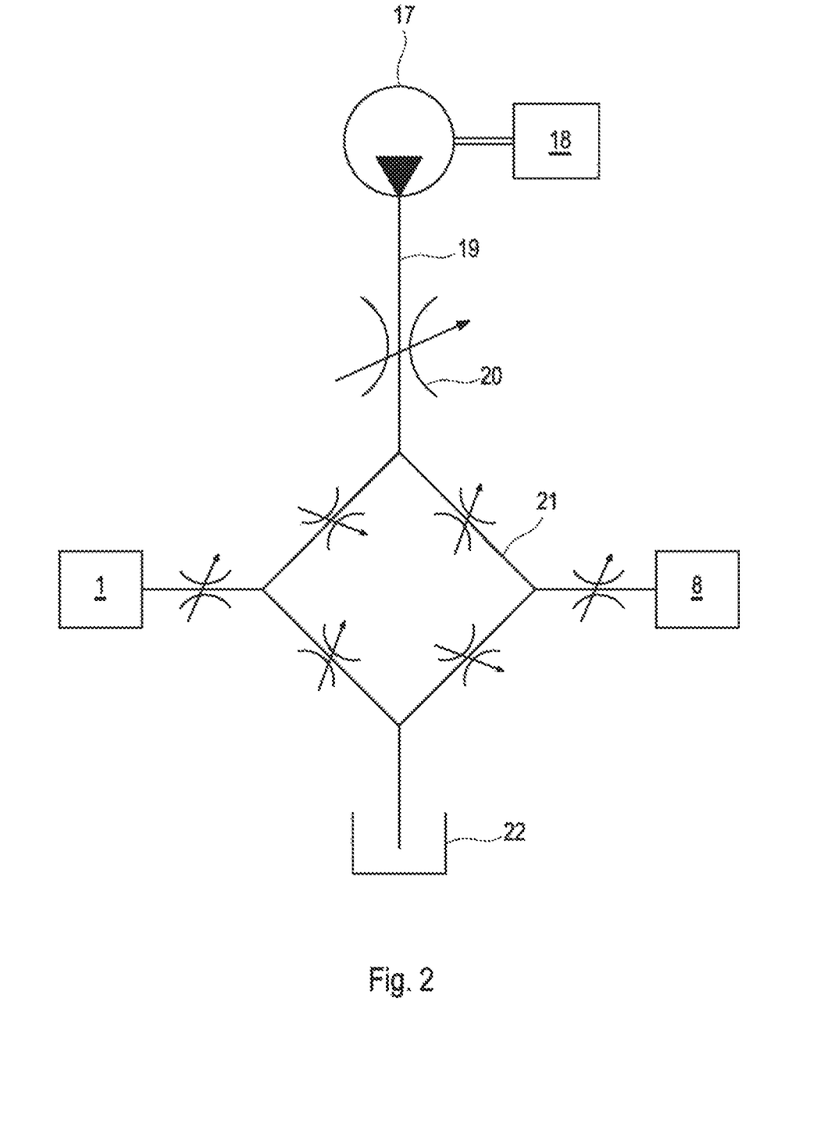
FIG. 2 shows a schematic illustration of a positive displacement pump 17 having a steering valve 21 and a restrictor 20.

FIG. 2 shows a schematic illustration of the positive displacement pump 17 which ensures the supply of fluid to a ball-nut steering system. Moreover, a steering valve 21 and a restrictor 20 are illustrated. The pulsations of the positive displacement pump 17 can be reduced by restricting the line 19. However, this results in a permanent rise in the pressure of the fluid in the positive displacement pump 17, and the fluid, e.g. hydraulic oil, may be heated up by the restriction in such a way that cooling becomes necessary. As an alternative, expanding hoses and/or volumes, which have similar disadvantages, can be provided. According to the disclosure, therefore, the intention is that a reduction in the pulsations should be performed only where it is at the most effective and where there are hardly any disadvantages or no disadvantages. This region is, in particular, cylinder chamber 1 (see FIG. 1). Damping just this section is also advantageous because flow through cylinder chamber 1 occurs only during steering and it is therefore only then that damping of the pulsations is necessary. Since a heavy goods vehicle is generally driven straight ahead, damping particularly of the fluid to cylinder chamber 1 can therefore allow effective damping subject to only slight disadvantages for this reason too.

Figure 3:
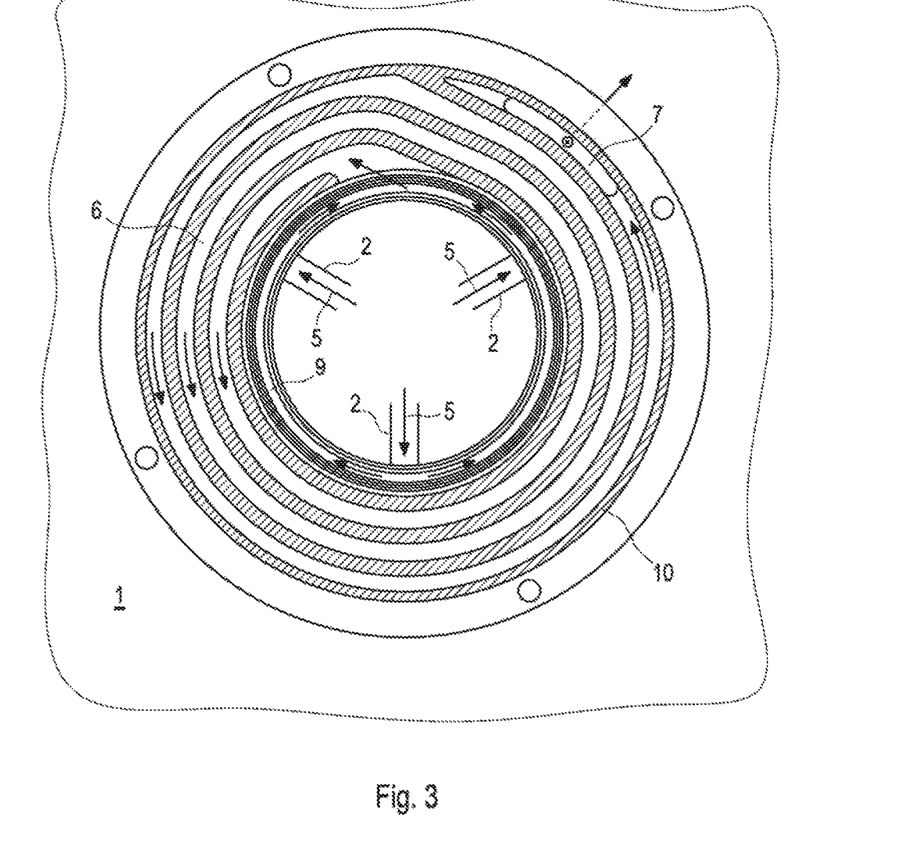
FIG. 3 shows a device 10 according to the disclosure for damping the pulsations caused by the positive displacement pump.

FIG. 3 shows a damping device 10, which can be arranged, in particular, in the small cylinder space 1. An oil flow 5 is introduced into the damping device 10 through feed bores 2. First of all, the oil flow 5 enters an annular channel 9. In a further step, the oil flow 5 flows through a channel 6 in the form of a spiral disk and leaves the damping device 10 through an opening 7. By means of this damping device 10, it is possible to achieve damping of the pulsations of the oil flow 5.

Figure 4:
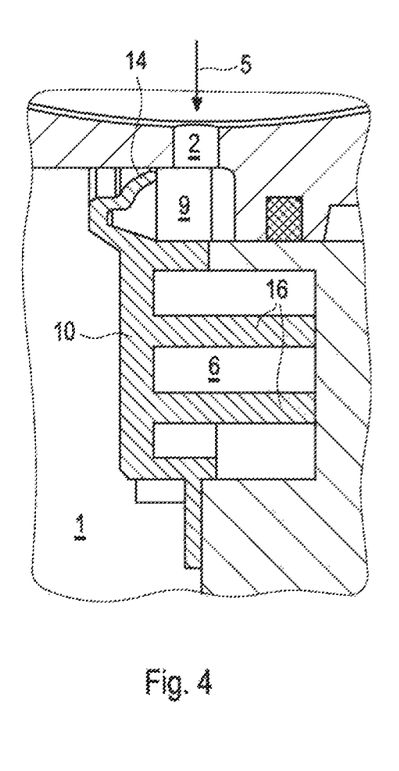
FIG. 4 shows an embodiment according to the disclosure of the device 10 for damping in cross section, wherein the device 10 is designed as an insert, wherein the wall 16 is sealed off permanently with respect to the housing by positive engagement (welding, brazing, adhesive bonding, forming)

FIG. 4 shows a device 10 for pulsation damping in cross section, wherein the device 10 is designed as an insert and is connected permanently to the ball-nut steering system. The device 10 results in a defined extension of the feed path of the oil flow 5 to the smaller cylinder chamber 1 of the ball-nut steering system. First of all, the oil flow 5 enters the annular channel 9 through the feed bores 2 and, from said channel, enters the spiral channel 6. The spiral channel 6, in particular, results in a large extension of the path of the oil flow 5 to the small cylinder chamber 1. This long path to cylinder chamber 1 results in damping of the pulsations of the positive displacement pump. The risk of a "hard point" can be prevented by a "bypass". For this purpose, the device 10 has a sealing lip 14, which acts as a "valve". If the oil flow 5 is forced into the ball-nut steering system, the device 10 forms an obstacle, resulting in a higher pressure level in the annular channel 9 than in cylinder chamber 1, wherein the sealing lip 14 is pressed against the ball-nut steering system and ensures that the oil flow 5 is passed through the device 10. If an oil flow 5 is forced out of cylinder chamber 1 of the ball-nut steering system, the device 10 forms an obstacle, resulting in a higher pressure level in cylinder chamber 1 than in the annular channel, wherein the sealing lip 14 is pushed away from the ball-nut steering system, thereby allowing the oil flow 5 to leave the ball-nut steering system while bypassing the device 10. The sealing lip 14 therefore acts as a bypass of the device 10, wherein an oil flow 5 flowing in the direction of cylinder chamber 1 ensures that the sealing lip 14 rests against the ball-nut steering system. If there is an opposite oil flow 5, there is an excess pressure in cylinder chamber 1, causing the sealing lip 14 to open, thus allowing an oil flow 5 out of the ball-nut steering system while bypassing the device for damping.

Figure 5:
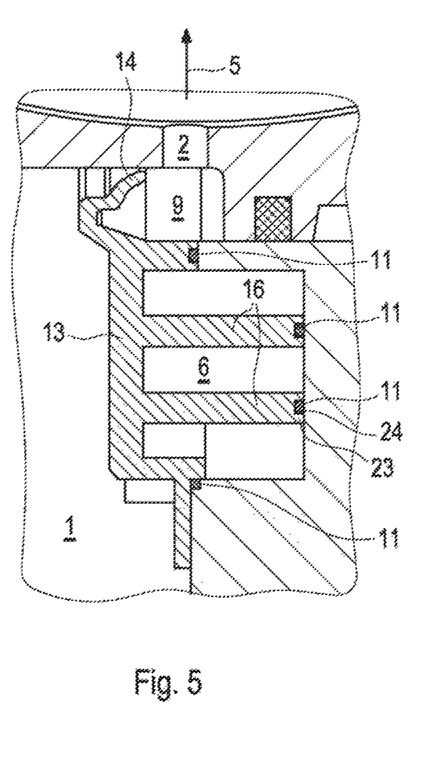
FIG. 5 shows an embodiment according to the disclosure of the device 13 for damping in cross section, wherein the device 13 is designed as an insert, in particular for retrofitting, wherein the wall 16 is sealed off with respect to the housing by a seal 24.

FIG. 5 shows the device 13 for pulsation damping, wherein the device 13 is designed as an insert. The device 13 has seals 11, thereby making it possible to retrofit a ball-nut steering system with the device 13 as an insert.

Figure 6:
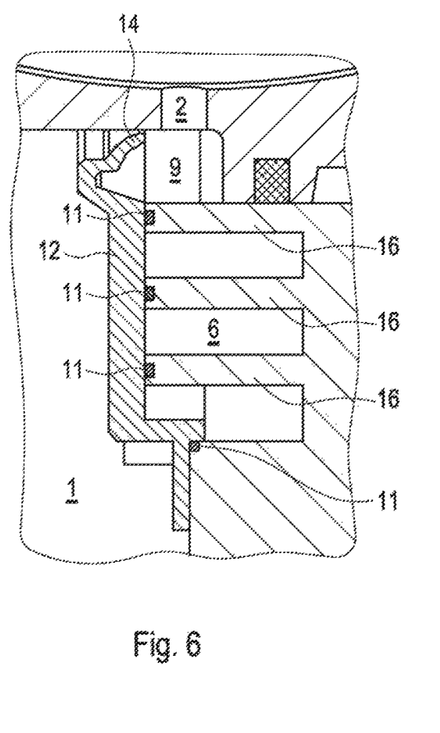
FIG. 6 shows an embodiment according to the disclosure of the device for damping in cross section, wherein the wall 16 of the device is designed as an integral part of the ball-nut steering system, and the wall 16 is separated from the cylinder chamber 1 by a plate 12.

FIG. 6 shows another alternative embodiment of the disclosure, wherein the walls 16 of the device for pulsation damping are connected integrally to the ball-nut steering system. A plate 12 is provided in order to achieve a channel-type shape to guide the oil flow 5.

Figure 7:
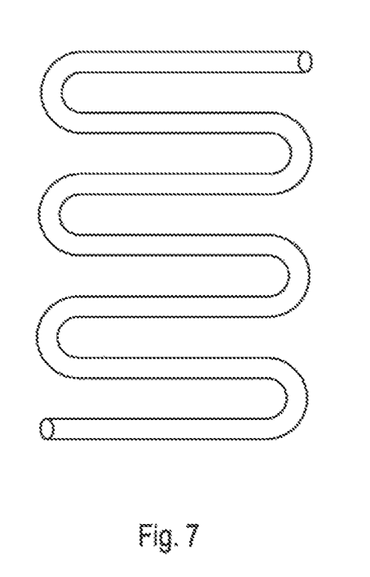
FIG. 7 shows a device for damping in serpentine form or of meandering design.

FIG. 7 shows a serpentine or meandering design of the device according to the disclosure for damping in order to form an elongated path for the fluid concerned. The elongated path produces damping of the fluid.

Figure 8:
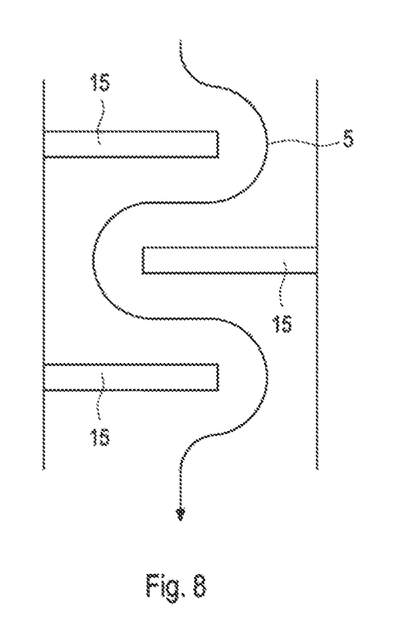
FIG. 8 shows obstacles 15 for diverting a fluid flow 5.

FIG. 8 shows an arrangement of obstacles 15 which lead to the fluid flow 5 being serpentine in form and thereby enable the fluid to be calmed.

It should be noted that the term "comprise" does not exclude further elements or method steps, just as the terms "a" and "one" do not exclude a plurality of elements and steps.

The reference signs used serve merely to enhance clarity and should not be regarded in any case as restrictive, wherein the scope of protection of the disclosure is represented by the claims.

LIST OF REFERENCE SIGNS 1 small cylinder chamber
2 feed bore
5 fluid flow
6 channel in the form of a spiral disk
7 opening
8 large cylinder chamber
9 annular channel
10 device according to the disclosure for pulsation damping as an integral part of the ball-nut steering system
11 seal
12 plate of the device according to the disclosure for damping
13 device according to the disclosure for damping, wherein the device is designed as an insert for retrofitting in the ball-nut steering system
14 sealing lip
15 obstacle for fluid flow
16 wall of the device for damping
17 pump, in particular positive displacement pump
18 motor
19 fluid line
20 restrictor
21 steering valve
22 fluid tank
23 web
24 free space for accommodating a seal

The invention claimed is:

1. A ball-nut steering system of a conventional-cab vehicle, comprising:
a first cylinder chamber and a second cylinder chamber each configured to receive a fluid;
a first feed line configured to carry the fluid from a pump to the first cylinder chamber; and
a device including a spiral, serpentine, or meandering channel configured to channel the fluid, the device arranged within the first cylinder chamber and/or within the first feed line and configured to damp and/or calm pulsations of the fluid,
wherein the first cylinder chamber is smaller in volume than the second cylinder chamber, and
wherein the fluid flows through the spiral, serpentine, or meandering channel to the first cylinder chamber.

2. The ball-nut steering system as claimed in claim 1, wherein the device is planar.

3. The ball-nut steering system as claimed in claim 1, wherein:
the device is an insert configured to be retrofit in the ball-nut steering system and/or includes webs configured to form an interspace; and
the interspace is configured to accommodate a seal.

4. The ball-nut steering system as claimed in claim 1, wherein the device is connected integrally to the ball-nut steering system.

5. The ball-nut steering system as claimed in claim 1, wherein the device includes a bypass configured to allow the fluid to flow out of the ball-nut steering system while bypassing the device.

6. The ball-nut steering system as claimed in claim 5, wherein the bypass is a sealing lip.

7. The ball-nut steering system as claimed in claim 1, wherein the device includes a plate configured to be placed against walls of the ball-nut steering system in order to form the spiral, serpentine, or meandering channel.

8. The ball-nut steering system as claimed in claim 1, wherein the device includes a plurality of obstacles forming a spiral, serpentine, and/or meandering path along which the fluid flows.

9. The ball-nut steering system as claimed in claim 1, wherein the device is configured to produce a change in a direction of a fluid flow of the fluid.

10. The ball-nut steering system as claimed in claim 1, wherein the fluid is an oil.

11. The ball-nut steering system as claimed in claim 1, wherein:
the device defines a travel distance of the fluid of 150 mm to 700 mm; and
the spiral, serpentine, or meandering channel has a cross section of 16 mm$^2$ to 38 mm$^2$.

12. The ball-nut steering system as claimed in claim 9, wherein the change in the direction of the fluid flow is a 180° turn.

13. A steering system for a vehicle, comprising:
a ball-nut steering system including:
a first cylinder chamber and a second cylinder chamber each configured to receive a fluid;
a first feed line configured to carry the fluid from a pump to the first cylinder chamber; and
a device including a spiral, serpentine, or meandering channel configured to channel the fluid, the device arranged within the first cylinder chamber and/or within the first feed line, and configured to damp and/or calm pulsations of the fluid,
wherein the first cylinder chamber is smaller in volume than the second cylinder chamber, and
wherein the fluid flows through the spiral, serpentine, or meandering channel to the first cylinder chamber.

* * * * *